United States Patent
Schoor

(10) Patent No.: US 11,422,251 B2
(45) Date of Patent: Aug. 23, 2022

(54) ANGLE-RESOLVING BROADBAND RADAR SENSOR FOR MOTOR VEHICLES

(71) Applicant: Robert Bosch GmbH, Stuttgart (DE)

(72) Inventor: Michael Schoor, Stuttgart (DE)

(73) Assignee: Robert Bosch GmbH, Stuttgart, NY (US)

( * ) Notice: Subject to any disclaimer, the term of this patent is extended or adjusted under 35 U.S.C. 154(b) by 149 days.

(21) Appl. No.: 16/963,395

(22) PCT Filed: Dec. 14, 2018

(86) PCT No.: PCT/EP2018/084897
§ 371 (c)(1),
(2) Date: Jul. 20, 2020

(87) PCT Pub. No.: WO2019/158252
PCT Pub. Date: Aug. 22, 2019

(65) Prior Publication Data
US 2021/0364626 A1 Nov. 25, 2021

(30) Foreign Application Priority Data
Feb. 15, 2018 (DE) .......................... 102018202289.5

(51) Int. Cl.
*G01S 13/87* (2006.01)
*G01S 7/35* (2006.01)
(Continued)

(52) U.S. Cl.
CPC ............ *G01S 13/878* (2013.01); *G01S 7/356* (2021.05); *G01S 13/34* (2013.01); *G01S 13/4454* (2013.01); *G01S 13/931* (2013.01)

(58) Field of Classification Search
CPC ........ G01S 1/306; G01S 1/0428; G01S 1/022; G01S 13/84; G01S 13/751
(Continued)

(56) References Cited

U.S. PATENT DOCUMENTS

| 9,395,727 B1 * | 7/2016 | Smith ................... G05D 1/0257 |
| 11,019,246 B2 * | 5/2021 | Sivan ...................... G06F 3/013 |

(Continued)

FOREIGN PATENT DOCUMENTS

| DE | 102015222884 A1 | 5/2017 | |
| EP | 3120463 B1 * | 1/2018 | ............. B60L 53/12 |

(Continued)

OTHER PUBLICATIONS

International Search Report for PCT/EP2018/084897, dated Mar. 15, 2019.

*Primary Examiner* — Peter M Bythrow
*Assistant Examiner* — Nuzhat Pervin
(74) *Attorney, Agent, or Firm* — Norton Rose Fulbright US LLP; Gerard Messina

(57) ABSTRACT

Angle-resolving radar sensor for motor vehicles, including: an antenna array including multiple antennas, configured for receiving, situated in various positions in one direction in which the radar sensor is angle-resolving, and a control and evaluation unit configured for an operating mode in which at least one antenna of the radar sensor configured for transmitting transmits a signal received by multiple of the antennas of the radar sensor configured for receiving, and the angle of a radar target is estimated based on amplitude and/or phase relationships between signals of respective evaluation channels, which correspond to different configurations of transmitting and receiving antennas, an evaluation of the signals of the evaluation channels for a respective distance for a respective evaluation channel taking place for an individual estimation of an angle of a radar target, different distances being selected for respective evaluation channels as a function of an angle or angle range hypothesis.

10 Claims, 3 Drawing Sheets

(51) Int. Cl.
*G01S 13/34* (2006.01)
*G01S 13/44* (2006.01)
*G01S 13/931* (2020.01)

(58) Field of Classification Search
USPC .......................................... 342/47
See application file for complete search history.

(56) References Cited

U.S. PATENT DOCUMENTS

| | | | |
|---|---|---|---|
| 2006/0022866 A1* | 2/2006 | Walton | H01Q 21/08 342/126 |
| 2012/0001791 A1* | 1/2012 | Wintermantel | G01S 7/023 342/109 |
| 2014/0320331 A1* | 10/2014 | Fernandes | G01S 13/887 342/22 |
| 2015/0204972 A1* | 7/2015 | Kuehnle | G01S 13/42 342/156 |
| 2016/0131742 A1* | 5/2016 | Schoor | G01S 13/931 342/128 |
| 2017/0153316 A1* | 6/2017 | Wintermantel | H03M 7/24 |
| 2018/0172813 A1* | 6/2018 | Rao | G06F 17/142 |

FOREIGN PATENT DOCUMENTS

| | | |
|---|---|---|
| JP | H09311186 A | 12/1997 |
| JP | H11271433 A | 10/1999 |
| JP | 2002350533 A | 12/2002 |
| JP | 2010096589 A | 4/2010 |
| JP | 2010515878 A | 5/2010 |

\* cited by examiner

ANGLE-RESOLVING BROADBAND RADAR SENSOR FOR MOTOR VEHICLES

The present invention relates to an angle-resolving radar sensor for motor vehicles, including an antenna array that includes multiple antennas configured for receiving, which are situated in different positions in a direction in which the radar sensor is angle-resolving, and including a control and evaluation unit, which is designed for an operating mode in which at least one antenna of the radar sensor that is configured for transmitting transmits a signal, which is received by multiple of the antennas of the radar sensor configured for receiving, and the angle of a radar target is estimated based on amplitude and/or phase relationships between signals of respective evaluation channels, which correspond to different configurations of transmitting and receiving antennas.

BACKGROUND INFORMATION

Radar sensors are used in motor vehicles, for example, for measuring distances, relative velocities and azimuth angles of vehicles or other radar targets located ahead of the host vehicle. Multiple antennas are then situated, for example, at a distance to one another on a horizontal, so that different azimuth angles of the located radar targets result in differences in the run lengths which the radar signals must travel from the radar target to the respective antenna. These differences in run lengths result in corresponding differences in the amplitude and phase of the signals received by the antennas and evaluated in the associated evaluation channels. The angle estimation makes use of the fact that the amplitude relationships and phase relationships of the signals received by the various receiving antennas are characteristically a function of the angle of the radar target. By comparing the (complex) amplitudes received in the various channels with corresponding amplitudes in an antenna diagram, it is then possible to determine the incidence angle of the radar signal and thus the azimuth angle of the radar target. Similarly, it is possible to also estimate the elevation angle of a radar target with antennas situated vertically above one another.

For a single target, the comparison between the received amplitudes and the amplitudes in the antenna diagram may take place by calculating for each angle in the antenna diagram a correlation between the vector of the measured amplitudes (with k evaluation channels, this is a vector having k complex components) and the corresponding vector in the antenna diagram. This correlation may be expressed by a so-called DML function (Deterministic Maximum Likelihood Function) which, when a particular vector of measured amplitudes is given, specifies for each angle the likelihood that the radar target is located at this angle. The angle estimation then involves seeking the maximum of this DML function. In addition to maximum likelihood methods, other conventional methods for angle estimation are possible, such as MUSIC (Multiple Signal Classification) or ESPRIT (Estimation of Signal Parameters via Rotational Invariance Techniques).

SUMMARY

As part of a further increase in the efficiency of the radar sensors, d,v estimations will be able to take place with enhanced resolution.

An increase of the usable sensor size, i.e., the size or aperture of the antenna array, will also enable an increase in the accuracy of the angle estimation and an improved angular separation. In an FMCW (frequency modulated continuous wave) measuring method with linear frequency ramps and an evaluation of the received signals with the aid of discrete Fourier transform, in particular, FFT (Fast Fourier transform), the width of a distance bin of the Fourier transform corresponds to a difference in distance $\Delta r$ where $\Delta r = c/(2F)$, c being the speed of light and f being the frequency deviation of a linear frequency ramp of the FMCW transmit signal. This difference in distance is also referred to here as distance resolution.

Thus, the distance resolution is understood to be the smallest difference in distance, in which (at the same relative velocity) two measured values of the distance from the radar sensor in the given operating mode of the radar sensor may still be mapped to separate bins. When carrying out an FFT, the distance resolution corresponds to the spacing of two distance bins during the FFT, i.e., to the width of one distance bin. Here and in the following, the terms distance resolution and width of the distance bin are used synonymously. In contrast, the distance separability is understood to mean double the width of the distance bin. If the bandwidth of a radar sensor is increased, a distance resolution of $\Delta r = 7.5$ cm is possible, for example, in the case of a frequency deviation of the transmit signal of F=2 GHz. If the aperture or, in the case of a MIMO (Multiple Input Multiple Output) radar sensor, the virtual aperture is also increased to values of a similar magnitude, then, depending on the angle of a radar target, the differences in run length between received signals of individual antennas or evaluation channels may be detected already as different distances from radar targets. In the case of larger angles, the vector of the measured amplitudes is then no longer completely included in the Fourier spectra of the evaluation channels at a frequency position determined by the d,v estimation of a detected radar target. It is possible to counter this by artificially reducing the utilized aperture of the antenna array for the detection of larger angles. Alternatively, it is possible for the vector of the measured amplitudes to be fully obtained via a selection of a smaller bandwidth and the accompanying widening of the frequency bins of the Fourier spectra. However, both have the disadvantage that it is not possible to achieve the full distance resolution and the full angle separability simultaneously.

The above described differences in run length at a large bandwidth and with a large aperture have multiple ramifications, in particular, in the case of Fourier spectra obtained by FFT.

On the one hand, the signal corresponding to a peak may be mapped in the respective evaluation channels in different frequency bins of the FFT if the differences in run length between received signals are detected as different distances from radar targets.

On the other hand, a phase shift occurs in this case, which amounts to Pi per shift by one bin. This phase shift occurs if the supporting point (frequency position) of an FFT does not correspond exactly to the frequency position that corresponds to the real, individual distance of the respective antenna configuration. The phase shift may be taken into account in the antenna calibration by using an antenna diagram determined for identical frequency deviations for the angle estimation.

Furthermore, an amplitude error occurs as a result of the window function used for forming the FFT. This amplitude error may not be readily taken into account when calibrating the antennas.

An object of the present invention is to provide a radar sensor that permits a simple and exact angle estimation, even in the case of large antenna arrays and signals having a high bandwidth.

This object may be achieved according to an example embodiment of the present invention. In accordance with an example embodiment of the present invention, a control and evaluation unit is designed to carry out in the aforementioned operating mode for an individual estimation of an angle of a radar target an evaluation of the signals of the evaluation channels for a respective distance for a respective evaluation channel, different distances being selected for respective evaluation channels as a function of an angle hypothesis or angle range hypothesis at least for one angle hypothesis or angle range hypothesis. Thus, for an individual estimation of an angle of a radar target, each evaluation channel is assigned a respective distance for which the evaluation is carried out.

For example, the evaluation of the signals of the evaluation channels may be carried out at a respective frequency position for a respective evaluation channel, different frequency positions for respective evaluation channels being selected as a function of an angle hypothesis or angle range hypothesis at least for one angle hypothesis or angle range hypothesis. Thus, in the case of an FMCW radar sensor, for example, respective frequency positions correspond to respective distances.

For example, control and evaluation unit 30 may be designed to carry out in the aforementioned operating mode for an individual estimation of an angle of a radar target the evaluation of the signals of the evaluation channels for the respective evaluation channel at a respective frequency position that corresponds to the relevant distance.

In accordance with an example embodiment of the present invention, the object is also achieved by a method for a radar sensor for motor vehicles, for estimating the angle of radar targets based on amplitude relationships and/or phase relationships between signals, which are obtained for different configurations of transmitting and receiving antennas of the radar sensor in respective evaluation channels of the radar sensor, in which an evaluation of the signals of the evaluation channels for a respective distance for a respective evaluation channel is carried out for an individual estimation of an angle of a radar target, different distances being selected for respective evaluation channels as a function of an angle hypothesis or angle range hypothesis at least for one angle hypothesis or angle range hypothesis.

To estimate the angle, an evaluation of the amplitude and/or of the phase of the relevant signals of the evaluation channels for the respective distance, in particular, takes place, or an evaluation of the amplitude and/or of the phase of the relevant signals at the respective frequency position of the evaluation channels takes place.

Thus, for the angle estimation, a vector is used, the components of which correspond to different distances or frequency positions of the signals of the respective evaluation channels; for at least one angle hypothesis, therefore, the distances or frequency positions for at least two evaluation channels differ from one another. The effect that a shift of the frequency position of the peak corresponding to the radar target occurs at a large bandwidth and with a large aperture, depending on the angle of a radar target and depending on the configuration of the transmitting and receiving antennas of an evaluation channel, may be countered as a result.

The differences between the distances or frequency positions may also be selected as a function of the distance of the radar target. At long distances, therefore, the angle difference, at which different antennas "see" the radar target, is less than at shorter distances; accordingly, the difference in run length of the signals is also less.

The antenna array is preferably a planar array of the antennas, for example, an antenna array having a regular offset between the receiving antennas, or a thinned-out antenna array.

Advantageous embodiments and refinements of the present invention are described herein.

In one advantageous specific embodiment of the present invention, the control and evaluation unit is designed to take into consideration in the aforementioned operating mode angle-dependent differences in distance corresponding to the configurations of transmitting and receiving antennas of the evaluation channels as differences of the distances or shifts of the frequency position between relevant evaluation channels. This means, the considered shifts of the frequency position correspond to the respective differences in distance. In this case, a distance dependency of the differences in distance may also be considered. A difference in distance may, for example, be indicated as a distance difference relative to an evaluation channel, or as a bin-shift relative to a bin of an FFT. With the increasing difference in run length, increasing differences of the distances or shifts of the frequency position are advantageously taken into consideration.

In one advantageous specific embodiment of the present invention, the control and evaluation unit is designed to select in the aforementioned operating mode for at least one evaluation channel distances or frequency positions that differ from one another at least for two angle hypotheses or angle range hypotheses.

In one advantageous specific embodiment of the present invention, the control and evaluation unit is designed to decide in the aforementioned operating mode for an individual estimation of an angle of a radar target, whether different distances or frequency positions for respective evaluation channels are selected as a function of a distance resolution of the radar sensor and as a function of the angle hypothesis or angle range hypothesis, and which distances or frequencies for respective evaluation channels are selected. For example, a consideration of a frequency shift may not be necessary for an angle at or around 0°. The decision may also be made as a function of the distance of the radar target.

In one advantageous specific embodiment of the present invention, the control and evaluation unit is designed to select in the aforementioned operating mode at least for one angle hypothesis or angle range hypothesis identical distances or frequency positions for the evaluation channels. The distances are used for estimating the angle. This angle (angle range) corresponds preferably to an average angle (angle range) or to a direction of symmetry of the radar sensor.

In one specific embodiment in accordance with an example embodiment of the present invention, the control and evaluation unit is designed to subject the received signals to a discrete Fourier transform, the control and evaluation unit being designed, in the aforementioned operating mode for the respective evaluation channels, to calculate spectral components for the selected distances or frequency positions during the discrete Fourier transform and to evaluate the estimation of the angle. With a direct calculation of the Fourier transform or of an individual Fourier component of the frequency spectrum at the respective selected frequency position, it is possible to avoid the above mentioned phase errors and amplitude errors of an FFT including a fixed frequency grid.

In another specific embodiment of the present invention, the control and evaluation unit is designed to calculate Fourier spectra for the respective evaluation channels from the received signals by discrete Fourier transform, the control and evaluation unit being designed to determine in the aforementioned operating mode the signals to be evaluated for the angle estimation for a respective distance or at a respective frequency position by interpolating spectral components of the relevant Fourier spectrum. This is particularly advantageous, since a calculation of the Fourier spectra of the receiving channels may take place regardless of the angle hypotheses, and then an evaluation of the signals for the angle estimation, in each case by interpolation, may also takes place at intermediate points between the support frequencies of the Fourier spectra, i.e., at frequencies that are adjacent to the respective frequency position. Thus, a high separability both in the distance as well as in the angle may be achieved with a simple and efficient calculation.

The features cited for the present invention and for the specific embodiments are particularly advantageous if, in the case of the radar sensor, a maximum difference in distance to a radar target generated by the configurations of transmitting and receiving antennas corresponds to at least 40% of the distance resolution, or corresponds, in particular, to at least 80% of the distance resolution for at least two evaluation channels. A maximum difference in distance to a radar target generated by the configurations of transmitting and receiving antennas preferably corresponds to at least 20%, further preferably to at least 33% or at least 40% or at least 50% or at least 80% or at least 100% of the distance resolution for at least two evaluation channels. At a difference in distance of more than 80% of the distance resolution, the amplitude error resulting in the FFT may, in particular, already become impermissibly large and, for example, exceed 1 dB, the tolerable error being a function of the respective application. The difference in distance maximally generated by the configurations of transmitting and receiving antennas may, for example, correspond at angles in the range of up to 90° to the (virtual) aperture of the antenna array.

Exemplary embodiments of the present invention are explained in greater detail below with reference to the figures.

DETAILED DESCRIPTION OF EXAMPLE EMBODIMENTS

Figure 1:
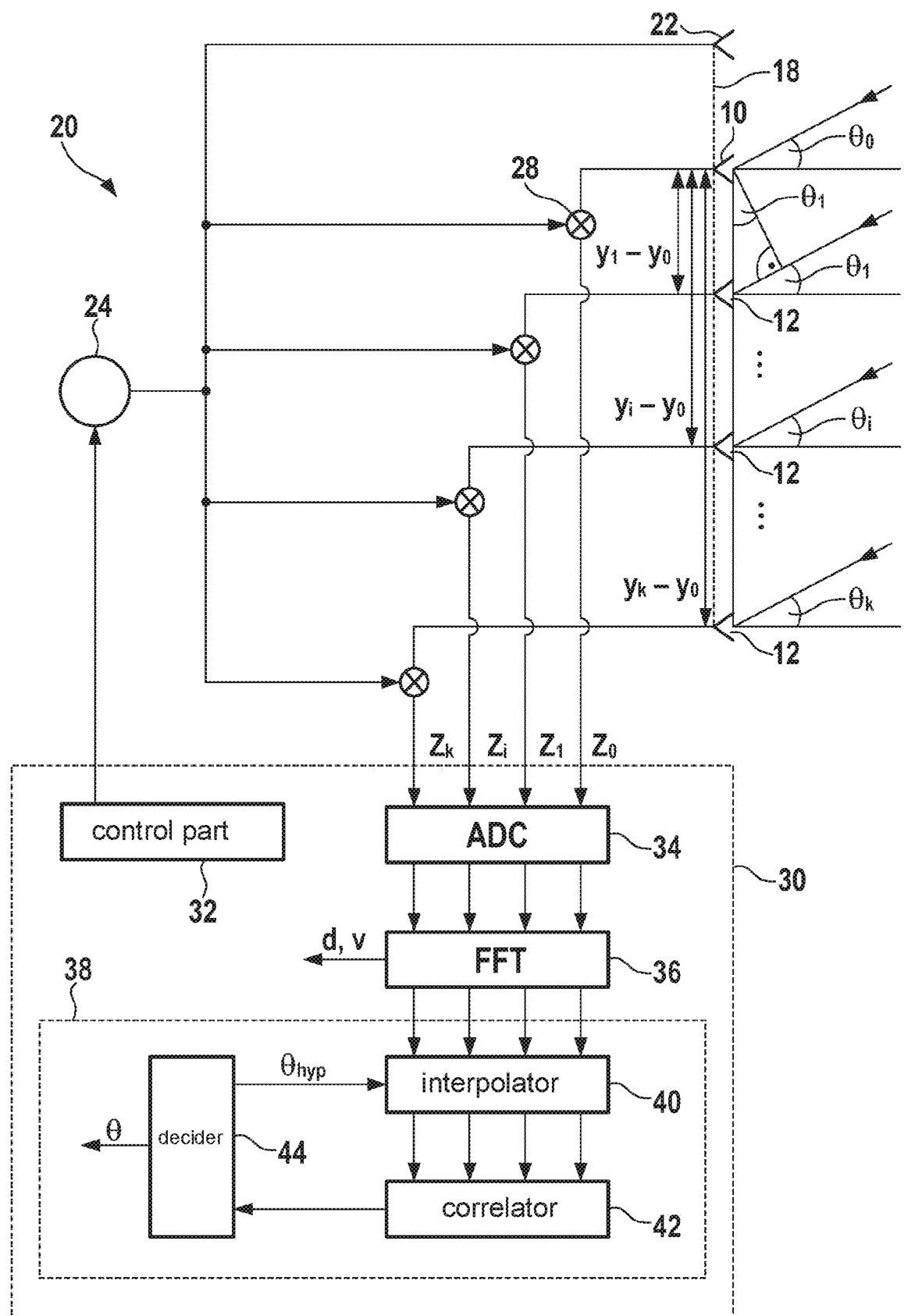
FIG. 1 shows a block diagram of a radar sensor according to an example embodiment of the present invention for motor vehicles.

The radar sensor shown in FIG. 1 includes multiple receiving antennas or antenna elements 10, 12 on a shared substrate 18. The radar sensor installed in a motor vehicle in such a way that multiple of antennas 10, 12 are situated at the same height next to one another at horizontal positions $y_i$, $i=0, \ldots, k$, so that an angle resolution capacity of the radar sensor in the horizontal (in the azimuth) is achieved. In FIG. 1, radar beams are symbolically represented, which are received by the antennas at a respective azimuth angle $G_i$.

A high-frequency part 20 for activating a transmitting antenna 22 includes a local oscillator 24, which generates the radar signal to be transmitted. The radar echoes received by antennas 10, 12 are each fed to a mixer 28, where they are mixed with the transmit signal supplied by oscillator 24. In this way, a base band signal or intermediate frequency signal $Z_0, Z_1, \ldots, Z_i, \ldots, Z_k$ is obtained for each of antennas 10, 12, which is fed to an electronic control and evaluation unit 30.

Control and evaluation unit 30 includes a control part 32, which controls the function of oscillator 24. The radar sensor in the example shown is an FMCW radar, i.e., the frequency of the transmit signal supplied by oscillator 24 is modulated periodically in the form of a sequence of rising and/or falling frequency ramps.

Control and evaluation unit 30 further includes an evaluation part including an analog-to-digital converter 34 having k channels, which digitizes intermediate frequency signals Z0-Zk obtained by the k antennas 10, 12 and in each case is recorded over the duration of a single frequency ramp. The time signals thus obtained are then converted channel-wise in a transformation stage 36 into corresponding frequency spectra via rapid Fourier transform. Each radar target in these frequency spectra appears in the form of a peak, whose frequency position is a function of the signal propagation time from the radar sensor to the radar target and back to the radar sensor, and—due to the Doppler effect—a function of the relative velocity of the radar target. Based on the frequency positions of two peaks that have been obtained for the same radar target, but on frequency ramps having different gradients, for example, a rising ramp and a falling ramp, it is then possible to calculate in a conventional manner distance d and relative velocity v of the relevant radar target.

As is schematically depicted in FIG. 1 based on the radar beams, the different positions of antennas 10, 12 mean that the radar beams that have been emitted by one and the same antenna, have been reflected at the radar target and are then received by the various antennas, travel different run lengths and therefore exhibit phase differences, which are a function of azimuth angle θ of the radar target. The associated intermediate frequency signals Z0-Zk also exhibit corresponding phase differences. The amplitudes (absolute values) of the received signals are also different from antenna to antenna, also as a function of azimuth angle θ. An angle estimator 38 compares the complex amplitudes with the antenna diagram obtained in the k receiving channels for each located object, i.e., each radar target (each peak in the frequency spectrum), in order in this way to estimate azimuth angle θ of the radar target. The angle estimator includes, for example, an interpolator 40, a correlator 42, and a decider 44, which are explained below.

Figure 2:
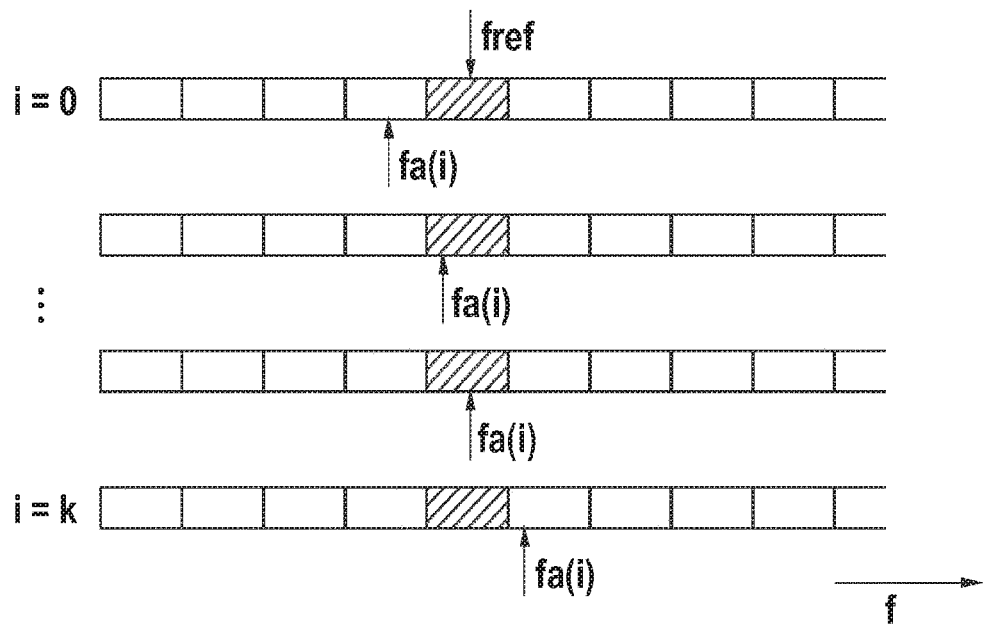
FIG. 2 schematically shows a representation of frequency bins of Fourier spectra of respective evaluation channels.

However, at a high bandwidth, corresponding to a large frequency deviation of the FMCW modulation, and to a large expanse of the antenna array, the complex amplitudes are included in the individual receiving channels at different frequency positions $f_a(i)$ in the frequency spectrum of the received signal, depending on azimuth angle θ of the radar target and depending on its distance d. This is schematically illustrated in FIG. 2, successive frequency bins of the Fourier spectrum being represented in the direction of increasing frequency f. The different frequency positions $f_a(i)$ correspond to different individual distances $d_i$. It may then no longer be assumed—in contrast to a conventional angle estimation—that the signals belonging to a radar target in the different evaluation channels are mapped in the same way, each to the same bin of the Fourier spectrum marked by cross-hatching in FIG. 2. To account for this effect, a respective frequency shift fa(i) to be expected for the individual channels i as a function of an angle hypothesis θhyp to be checked is calculated by interpolator 40. Interpolator 40 selects the spectral component(s) of the peaks to be used for the angle estimate on the basis of the expected frequency shift fa relative to a reference frequency position fref of the peak. The frequency position for an antenna configuration, for example, is selected as the reference frequency position fref, compared to which other antenna configurations in the case of a radar target having a central angle exhibits symmetrical frequency shifts to smaller or to larger angles. The frequency position for a central antenna may be selected as the reference frequency position. Interpolator 40 also carries out an interpolation of the frequency position of spectral components of the relevant bin adjacent to the selected frequency position, at least in the case of a selected frequency position between two frequency positions resulting from the frequency shift for which the FFT has been calculated, in order to determine a value of the frequency spectrum for the correct, selected frequency position having the correct amplitude and phase.

The signals in the individual channels determined and, if necessary, interpolated for the selected frequency positions, are passed as vectors to correlator 42, which calculates in a known manner a correlation of the complex amplitudes assembled in the vector with the antenna diagram for the relevant angle hypothesis and outputs the extent of the correlation to decider 44. Correlator 42 in this case accesses the stored antenna diagram. Decider 44 determines the value of the angle as the most probable value for the azimuth angle, in which the measured amplitudes of the vector best correlate with the values read in the antenna diagram. In accordance with a detection angle range of the radar sensor, multiple angle hypotheses or angle hypotheses ranges are checked for agreement of the measured signals with the signals calculated based on an antenna diagram. In this case, it is also possible that interpolator 40 does not determine the frequency positions for each individual angle hypothesis to be checked and carry out interpolations, but that interpolator 40 carries out a representative selection of frequency positions of the individual evaluation channels for ranges of angle hypotheses and, if necessary, an interpolation of the spectral components.

Thus, a preprocessing of the data incorporated into the angle estimation takes place for an angle hypothesis or an angle hypothesis range to be checked—depending on the necessity due to the angle and the distance resolution.

Thus, for a range of −30° to +30°, a vector may be directly assembled in each case from the same frequency position of the signals, for a range of +30° to +60° a shift of the frequency position representative for the respective evaluation channel for the range may be taken into consideration, etc.; the specified range limits serve merely to explain the principle and, in practice, may be determined for the angle estimation depending on the distance resolution and required accuracy of the data.

The dependency of the complex amplitudes, i.e., the absolute values and phases, of the received signals at the correct frequency positions of azimuth angle θ may be stored for each antenna in the form of a diagram in control and evaluation unit 30. The diagrams for the individual antennas may be combined to form an antenna diagram, which specifies for each antenna the amplitude of the received signal as a function of the azimuth angle.

Figure 3:
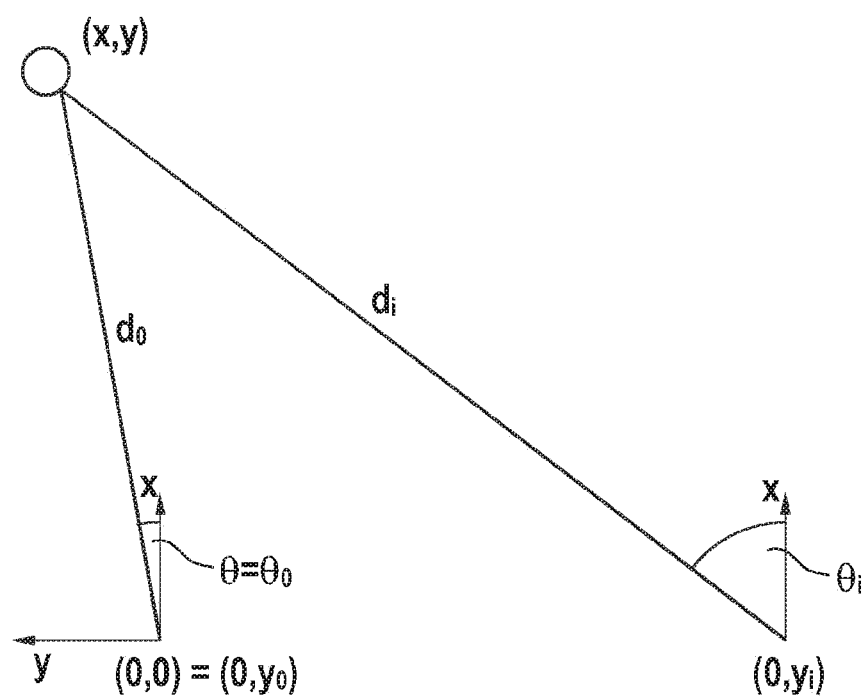
FIG. 3 shows a relationship between two antennas and a radar target.

FIG. 3 illustrates in a top view for two antennas, identified with the indices 0 and i at the coordinates 0,y0 and 0,yi, the relationship with a point target as a radar target at the coordinates x,y. The distances of the point target from the individual antennas are identified with d0, di, and the incidence angle (azimuth angle) of the received radar signal is identified with θ0 and θi. To simplify the representation, it is assumed that origin 0,0 represents the center point of the antenna array and corresponds to a central position of received antennas 10, 12.

For each antenna having the index i:

$$di = (x^2 + (y-yi)^2)^{1/2}$$

and $\theta i = a\,\tan((y-yi)/x)$ are applicable for the positions and angles of the radar target.

The coordinates of the radar targets relative to the original are to be ascertained as estimated values of the radar sensor, i.e., $$d = (x^2 + y^2)^{1/2}$$

and $\theta = a\,\tan(y/x)$.

Per antenna, the difference from the average variables is:

$$\Delta di = di - d = (x^2 + (y-yi)^2)^{1/2} - (x^2 + y^2)^{1/2}$$

and $\Delta \theta i = \theta i - \theta = a\,\tan((y-yi)/x) - a\,\tan(y/x)$,

Δdi referring to the difference in distance and Δθi to the difference in azimuth angle.

The difference in distance between the evaluation channels due to the differences in run length "seen" from the radar sensor is a function of the antenna configuration. In a bistatic system or in a MIMO system, therefore, the effects (distance and run time) for the path from the transmitting antenna to the target and from the target to the receiving antenna are added up and averaged.

The estimated distance is determined, for example, over the entire propagation time of the signal, divided into the path there and back and, therefore, as an average distance over the average propagation time of the signal.

Figure 4:
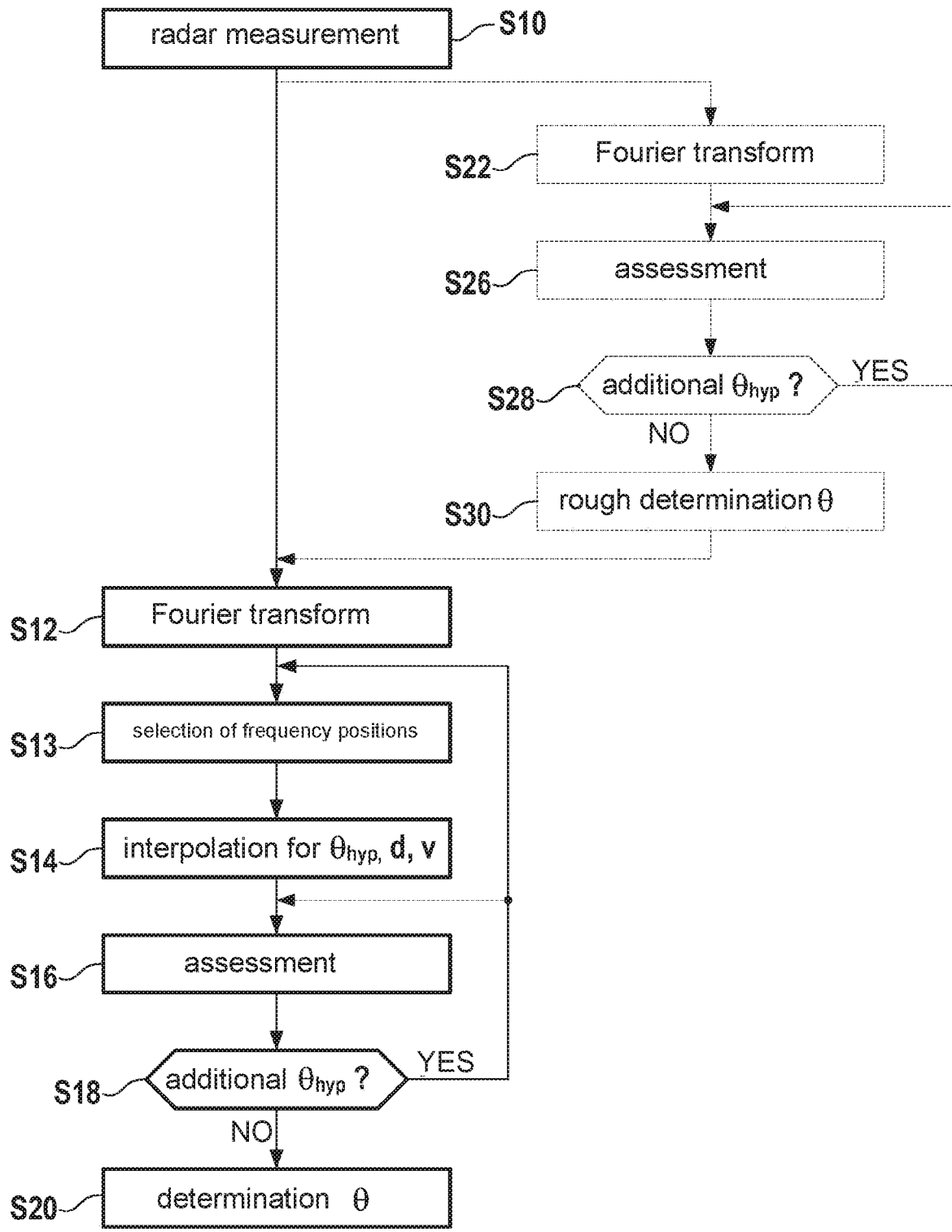
FIG. 4 shows a flow chart for explaining a method according to the present invention.

FIG. 4 illustrates a method according to the above described operating mode of the control and evaluation unit. In step S10, the radar measurement and the A/D conversion of the intermediate frequency signals of the channels take place. In step S12, a rapid Fourier transform (FFT) takes place in the respective evaluation channels. In step S14, an interpolation for the angle hypothesis or an angle hypothesis range to be checked takes place in the frequency spectrum of individual evaluation channels, in step S13 a respective frequency position, at which interpolation takes place in the relevant evaluation channel, being selected as a function of the angle hypothesis/of the angle hypothesis range and of d,v. In step S16, an assessment of the angle hypothesis/the angle hypothesis range for agreement of the measured and interpolated signals with signals expected based on the antenna diagram takes place by determining the correlation with an antenna diagram. If it is established in step S18 that still a further angle hypothesis is to be checked, a corresponding repetition takes place starting at step S13. The interpolation for a representative angle hypothesis of a range of angle hypotheses may also be carried out, whereas the relevant angle hypotheses of the range are still assessed individually. The repetition then takes place for a respective representative angle hypothesis starting at step S16, and for a new angle hypothesis range starting at step S13. Finally, the angle hypothesis having the best assessment is determined as the estimated angle in step S20.

In another exemplary embodiment, a conventional angle estimation is undertaken in a first step by control and evaluation unit 30, however, with a reduced size of the utilized antenna array. For the angle estimation in the first step, an evaluation of the Fourier spectra is undertaken in this case at an identical point, respectively, from the respective evaluation channels that correspond to a subset of the evaluation channels. Interpolator 40 is not used in the first step, for example. In the process, the utilized extent of the antenna array in the first direction is preferably limited to a value for which a maximum difference in distance to a radar target generated by the configuration of transmitting and receiving antennas corresponds to less than 80%, particularly preferably less than 40% of the distance resolution for at least two evaluation channels.

A rough angle estimation results in the first step. Based on the result of the first estimation, angle hypotheses or one or multiple angle range hypotheses are then determined, and the previously described evaluation is then carried out for these hypotheses with a selection of different frequency positions for respective evaluation channels. In this way, it is possible via a pre-estimation in the first step to reduce the processing effort for the more exact angle estimation in the second step.

FIG. 4 illustrates the rough angle estimation of the first step with steps S22, S26, S28 and S30 which, except for the reduced subset of the evaluation channels, correspond to steps S12 of the Fourier transform, to S16 of the assessment, to S18 and S20.

The described operating modes of the control and evaluation unit 30 may be accordingly provided in a MIMO radar sensor. In this case, k evaluation channels correspond to different configurations of transmitting and receiving antennas. If a receiving array formed by multiple receiving antennas 10, 12 has a real aperture of, for example, m λ, it is possible via the alternating use of two transmitting antennas 22 to form a virtual receiving array having double the aperture 2 m λ, so that more distinct phase and amplitude differences result and a sharper angle separation is thus enabled. Multiple transmitting antennas may also be simultaneously used for transmitting using a frequency or code multiplex method.

Antennas 10, 12, and 22 may be group antennas, each of which includes an array of patches, which are cophasally activated or are combined to form a received signal while maintaining the phases.

The exemplary embodiments described herein operate with a bistatic antenna arrangement. However, a monostatic antenna arrangement could optionally also be used, in which the same (group) antennas are utilized for transmitting and for receiving.

The described operating mode of the control and evaluation unit may be advantageously used, in particular, in FMCW radar sensors, which operate with so-called rapid-chirp sequences. In this case, a multitude of frequency ramps (chirps) having a large gradient and only a relatively short duration are passed through in rapid succession.

What is claimed is:

1. An angle-resolving radar sensor for a motor vehicle, comprising:
    an antenna array, including multiple antennas configured for receiving, which are situated in different positions in a direction in which the radar sensor is angle-resolving; and
    a control and evaluation unit configured for an operating mode in which at least one antenna of the radar sensor that is configured for transmitting transmits a signal, which is received by multiple ones of the antennas configured for receiving, and configured to estimate an angle of a radar target based on amplitude and/or phase relationships between signals of respective evaluation channels which correspond to different configurations of transmitting and receiving antennas of the antenna array;
    wherein the control and evaluation unit is configured to carry out, in the operating mode, for an individual estimation of an angle of the radar target, an evaluation of the signals of the evaluation channels for a respective distance for a respective one of the evaluation channels, different distances or respective evaluation channels being selected as a function of an angle hypothesis or angle range hypothesis at least for one angle hypothesis or angle range hypotheses;
    wherein, for at least two of the evaluation channels, a maximum difference in distance to the radar target generated by the configuration of transmitting and receiving antennas corresponds to a percentage of a distance resolution.

2. The radar sensor as recited in claim 1, wherein the control and evaluation unit is configured to carry out, in the operating mode, for the individual estimation of an angle of the radar target, the evaluation of the signals of the evaluation channels for the respective evaluation channel at a respective frequency position, which corresponds to the respective distance.

3. The radar sensor as recited in claim 1, wherein the control and evaluation unit is configured to take into consideration, in the operating mode, angle-dependent differences in distance corresponding to the configurations of transmitting and receiving antennas of the evaluation channels as differences of the distances between relevant evaluation channels.

4. The radar sensor as recited in claim 1, wherein the control and evaluation unit is configured to decide, in the operating mode, for the individual estimation of the angle of the radar target, as a function of a distance resolution of the radar sensor and as a function of the angle hypothesis or angle range hypothesis, whether different distances for respective ones of the evaluation channels are selected and which distances are selected for respective evaluation channels.

5. The radar sensor as recited in claim 1, wherein the control and evaluation unit is configured to subject the received signals to a discrete Fourier transform, the control and evaluation unit being configured to calculate, in the operating mode, spectral components for the selected distances for the respective evaluation channels during the discrete Fourier transform and to evaluate the estimation of the angle.

6. The radar sensor as recited in claim 1, wherein the control and evaluation unit is configured to calculate, via discrete Fourier transform, Fourier spectra for the respective evaluation channels from the received signals, the control and evaluation unit being designed to determine, in the operating mode, the signals to be evaluated for the angle estimation for a respective distance via interpolation of spectral components of the relevant Fourier spectrum.

7. The radar sensor as recited in claim 1, wherein, for at least two of the evaluation channels, the maximum difference in the distance to the radar target generated by the configuration of the transmitting and receiving antennas corresponds to at least 40% of the distance resolution.

8. An angle-resolving radar sensor for a motor vehicle, comprising:
- an antenna array, including multiple antennas configured for receiving, which are situated in different positions in a direction in which the radar sensor is angle-resolving; and
- a control and evaluation unit configured for an operating mode in which at least one antenna of the radar sensor that is configured for transmitting transmits a signal, which is received by multiple ones of the antennas configured for receiving, and configured to estimate an angle of a radar target based on amplitude and/or phase relationships between signals of respective evaluation channels which correspond to different configurations of transmitting and receiving antennas of the antenna array;
- wherein the control and evaluation unit is configured to carry out, in the operating mode, for an individual estimation of an angle of the radar target, an evaluation of the signals of the evaluation channels for a respective distance for a respective one of the evaluation channels, different distances or respective evaluation channels being selected as a function of an angle hypothesis or angle range hypothesis at least for one angle hypothesis or angle range hypotheses;
- wherein the control and evaluation unit is configured to carry out, in the operating mode, in a first step, a first angle estimation for the individual estimation of the angle of the radar target, based on the amplitude and/or phase relationships between the signals of the respective evaluation channels, which correspond to different configurations of transmitting and receiving antennas, one evaluation each taking place for an identical distance for estimating the angle in the evaluation channels used for the first angle estimation, and in a second step, the evaluation of the signals of the evaluation channels being carried out at a respective distance for a respective evaluation channel, angle hypotheses or angle range hypotheses, as a function of which different distances or respective evaluation channels are selected, being determined based on a result of the first angle estimation.

9. The radar sensor as recited in claim 8, wherein for the angle estimation, only those of the evaluation channels are used in the first step which correspond to configurations of transmitting and receiving antennas, which respective antennas form a part of the antenna array that has a reduced extent in the direction in which the radar sensor is angle-resolving, as compared to use of all evaluation channels.

10. A method for a radar sensor for a motor vehicle, the method comprising:
- obtaining amplitude and/or phase relationships between signals, for different configurations of transmitting and receiving antennas of the radar sensor in respective evaluation channels of the radar sensor; and
- evaluating, for an individual estimation of an angle of the radar target, the signals of the evaluation channels for a respective distance for a respective evaluation channel, wherein different distances for the respective evaluation channels are selected as a function of an angle hypothesis or angle range hypothesis at least for one angle hypothesis or angle range hypothesis;
- wherein, for at least two of the evaluation channels, a maximum difference in distance to the radar target generated by the configuration of transmitting and receiving antennas corresponds to a percentage of a distance resolution.

* * * * *